UNITED STATES PATENT OFFICE.

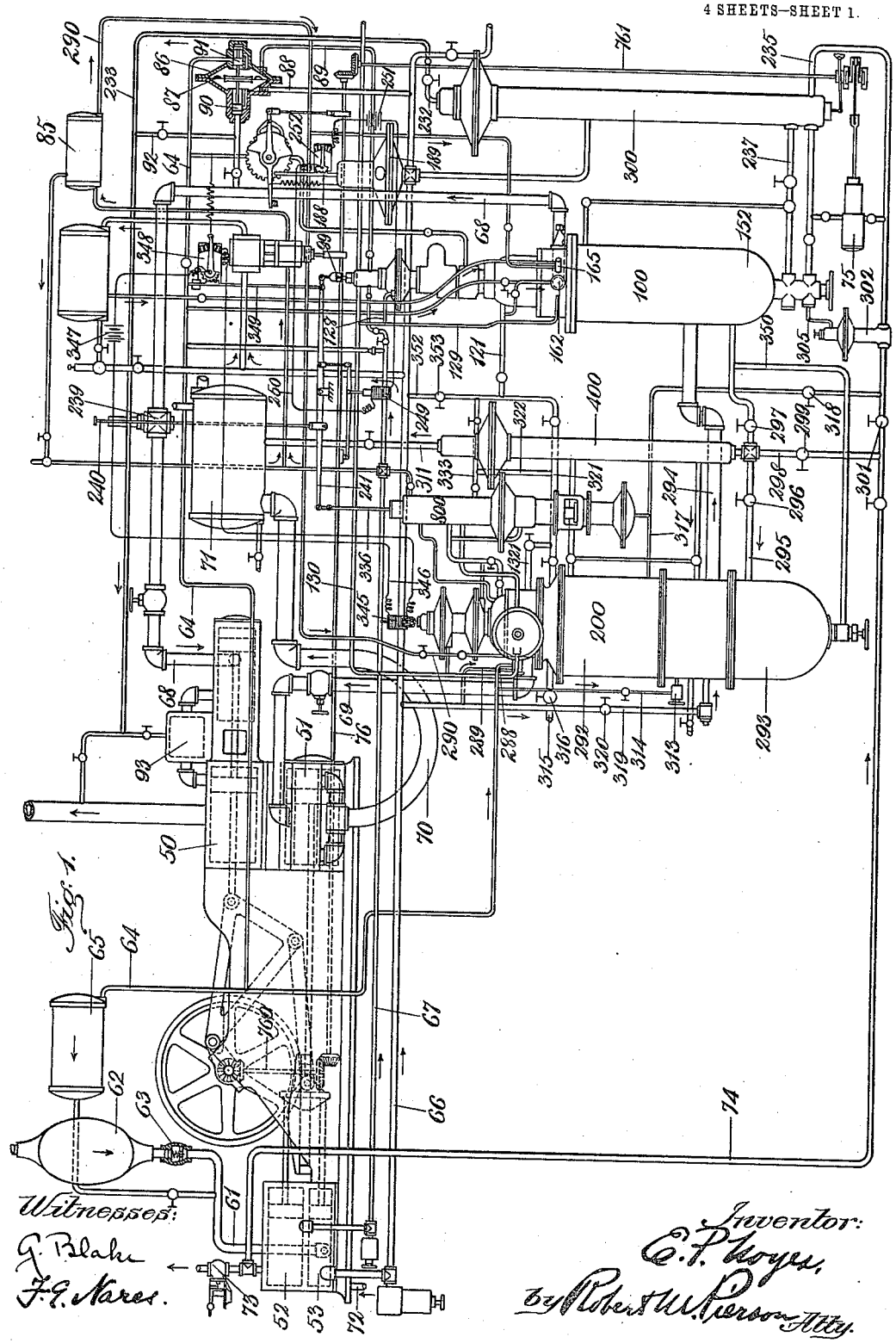

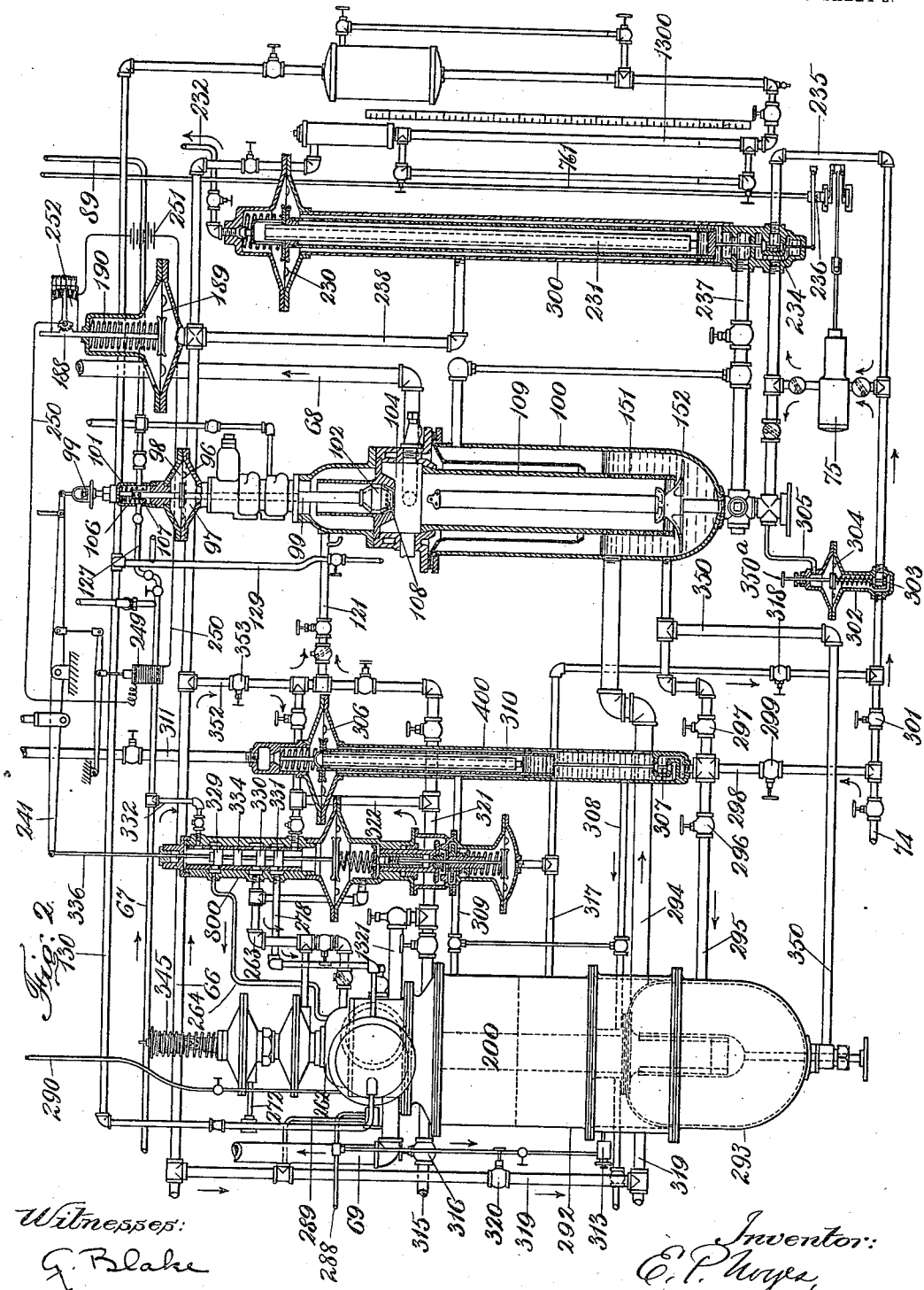

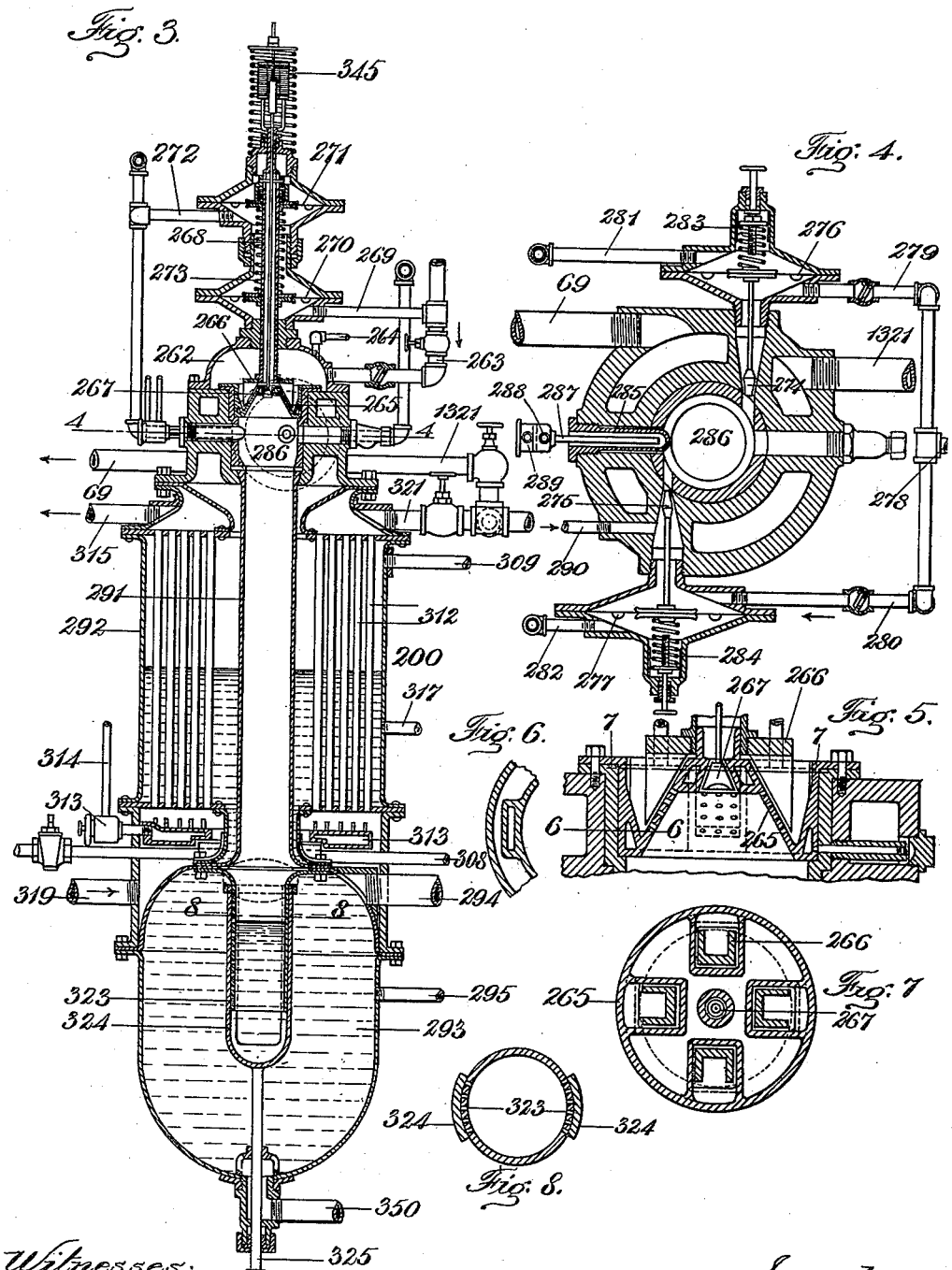

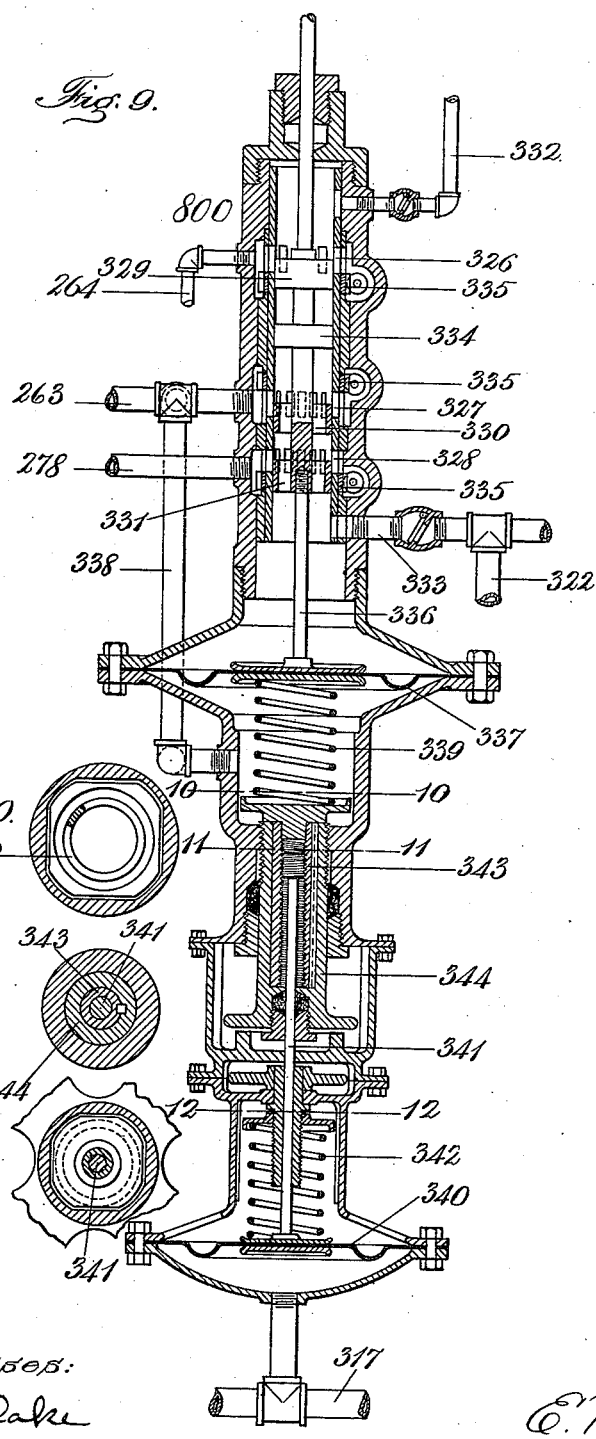

EDWARD P. NOYES, OF WINCHESTER, MASSACHUSETTS.

CONSTANT-PRESSURE INTERNAL-COMBUSTION APPARATUS.

1,013,609. Specification of Letters Patent. Patented Jan. 2, 1912.

Original application filed August 26, 1905, Serial No. 275,861. Divided and this application filed March 20, 1911. Serial No. 615,591.

*To all whom it may concern:*

Be it known that I, EDWARD P. NOYES, a citizen of the United States, residing at Winchester, in the county of Middlesex and State of Massachusetts, have invented certain new and useful Improvements in Constant-Pressure Internal-Combustion Apparatus, of which the following is a specification.

This invention relates to apparatus for converting the thermal energy of fuel into work and particularly to engines operating on the "Joule" cycle of combustion under constant pressure.

The present application is a division of my application Serial No. 275,861, filed August 26, 1905, and patented March 21, 1911, No. 987,160.

The main elements belonging to apparatus of the class to which these inventions relate are devices, such as air and gas compressors, for pumping air and fuel up to the maximum pressure of the system, a generator comprising a burner for burning the air and gas continuously, and a cooling-chamber containing a pool or spray of water in which the gases of combustion are quenched before entering the engine cylinder and their high-temperature heat embodied in a more useful form in the steam which, together with the gases of combustion, passes from the generator into the engine and is there employed expansively on the piston or other moving part of the motor. Other desirable features are suitable regulating devices for maintaining the air and gas for the burner in combustible proportions, and suitable automatic devices for maintaining the water-level in the generator under control.

In connection with such a system, the present invention has for its object the generation of pure steam unmixed with products of combustion, from the heat of combustion fluids at high pressure, enabling a greater pressure range to be attained by condensation than is ordinarily possible with this kind of power apparatus, and also the construction and regulation of generators for creating steam pressure in this manner and for conducting a parallel generation of steam mixed with products of combustion.

It also comprises provisions for effecting a start.

Of the accompanying drawings, Figure 1 represents a diagrammatic view of a power-generating apparatus embodying my invention. Fig. 2 represents a view on an enlarged scale of parts shown in Fig. 1. Fig. 3 represents a vertical section of one of the generators, being the one for generating pure steam as well as mixed motive-fluid. Fig. 4 represents a section on the line 4—4 of Fig. 3. Fig. 5 represents an enlarged vertical section of the burner portion of said generator. Figs. 6 and 7 represent sections on the lines 6—6, 7—7 of Fig. 5. Fig. 8 represents a section on the line 8—8 of Fig. 3. Fig. 9 is a section of an automatic regulator controlling the burner of the steam generator. Figs. 10, 11, and 12 are sections on the correspondingly numbered lines of Fig. 9.

I will first give a general description of the principal working elements of the apparatus.

50 is a compound-engine of the steam-engine type for receiving the mixed motive fluid composed of steam and products of combustion, and 51 is an engine connected to the same crank-shaft for receiving steam only. These engines are direct-connected to the air and gas compressors which are represented at 52, 53 and are preferably stage compressors. Gas is supplied to the suction of the gas-compressor through a pipe 61 in which is a flexible gas bag 62 and a backwardly-closing check-valve 63.

64 is a release-pipe containing a reservoir-chamber 65 and connecting with the gas suction-pipe 61 for conducting released gas from several devices hereinafter described back to the gas-compressor.

66 and 67 are respectively the compressed-air and compressed-gas conduits leading from the compressors to the generators.

100 is the generator for providing a motive fluid composed of steam and products of combustion and 200 is a second generator for supplying this fluid and in addition pure steam. These generators are worked in parallel and the mixed motive fluid therefrom passes by way of pipe 68 to the engine 50. The pure steam passes by pipe 69 to the engine 51 and, as the exhaust from this latter is condensable, I may carry it by a pipe 70 to a condenser 71. The mixed exhaust is condensable of course in lesser degree.

The steam-boiler embodied in the generator construction 200, besides being employed during normal running, is also useful for effecting a start of the apparatus.

Water is supplied by a pipe 72 seen in the upper left-hand corner of Fig. 1, first to the jackets of the compressors and also by way of pipe 74 to the suction of a pump 75 which supplies the cooling-chambers of the generators and is driven by shafts 76, 760, 761 and suitable gearing from the engine shaft. A back-pressure valve 73 insures a feed-water pressure which is utilized in starting as later described.

300 is an automatic level-controller for maintaining the feed-water in the cooling-chamber of generator 100 at a predetermined level and 400 is a similar level-controller for regulating the level in the steam-boiler of generator 200, this latter water-supply during normal running being derived from generator 100.

Pressure equality in the air and gas conduits is maintained by a pressure-balance mechanism 86 receiving the air and gas pressures on opposite sides of a diaphragm 87 through pipes 88, 89 and having piston-valves 90, 91 for releasing air through pipe 92 to the engine receiver 93 and releasing gas to the release-pipe 64.

Included in the foregoing general scheme and also in the particular construction and accessories of the two generating devices, are various mechanisms shown and claimed in Patent No. 987,160 aforesaid, and in my prior Patent No. 855,726, the description whereof is here repeated briefly for convenience in explaining the nature of the invention claimed in this application.

A resistance-valve mechanism, shown in section in Fig. 2 on the upper part of generator 100, is placed in the air and gas paths to said generator, and controlled by the differential action of the pressures on either side of it, which may be termed respectively the initial and the terminal or "sub-terminal" pressures, these pressures acting on opposite sides of a diaphragm, which also receives the pressure of a spring in aid of the terminal or sub-terminal pressure, so that the initial pressure always exceeds the terminal or sub-terminal pressure during fluid-flow by a difference measured by the quotient of the effective diaphragm area into the spring pressure. The automatic valve of this resistance mechanism is numbered 102 in Fig. 2. Generically, all pressures posterior to it are "terminal" as distinguished from the "initial" or anterior pressure, but specifically the immediate-terminal pressure just below said valve is slightly higher than the sub-terminal pressure posterior to the water-pool in cooling-chamber 152, which itself offers some pressure-reducing resistance to gaseous flow. The difference between these terminal pressures may be utilized in the automatic control of temperatures as hereinafter described, but for purposes of general description the distinction is unimportant. Valve 102 has a useful regulating function, its principal uses being, first to maintain velocities of flow of the combustion-fluids just prior to the point of ignition and thus prevent back-firing or back-flow and secure an efficient mixture of the air and gas and, secondly to afford a means for regulating both the air and gas and insuring proportionateness of the relative quantities going to the burner, by means of the pressure of a single one of these fluids acting on one side of the diaphragm and the terminal-pressure of the fluid or fluids before or after combustion, acting on the opposite side.

96 is the diaphragm receiving on its lower side in chamber 97, the pressure of the air initial or anterior to the valves controlled by the diaphragm, and on its upper side in chamber 98 the pressure of the burned fluids terminal or posterior to these valves. The diaphragm is attached to a hollow spindle 99 passing through a bearing in the top of the diaphragm-casing and receiving the pressure of a downwardly-acting spring 101 in aid of the terminal pressure. At its lower end spindle 99 carries the cone-valve 102 coöperating with a conical seat and controlling the flow of both air and gas into the combustion-chamber 104 immediately below it. The air flows around the outside of this valve, and the gas from chamber 106 containing the spring 101, entering the interior of spindle 99 through holes 107 in the spindle and spring-saddle, issues into the combustion-chamber 104 through a circumferential series of holes 108 near the lower lip of the cone-valve, facing on the valve-seat. The gas thus mixes with the air immediately before entrance into the combustion-chamber and the resistance imposed by the valve to the combined flow is that afforded by the lower lip of the valve in conjunction with the valve-seat. This resistance is that due to the pressure of the spring 101, and no matter what the pressure of the fluids, whether high or low, this resistance is always sustained and serves to maintain a velocity of flow at the point of ignition. It will be recognized that the parts immediately connected with the upper end of combustion-chamber 104 constitute the burner. Gas is supplied to the chamber 106 and thence to the interior of valve-spindle 99 through a pipe 127, branching from the gas-conduit 67. Sub-terminal pressure is supplied to the chamber 98 above the diaphragm through a branch 128 (Fig. 1) from a pipe 129 which connects with the generator on the posterior side of its water-pot, and also connects with a pipe 130 leading to generator 200. Products of combustion passing downwardly through combustion-tube 109, issue through a series of holes 151 in its lower portion into the cooling chamber or pot 152, in which is maintained a small body of water which continuously vaporizes, reducing the high temperature of the gases and creating a body of steam which passes on with said products into the engine-pipe 68. Ignition is effected in the combustion-chamber 104 by suitable devices 162, 163 (Fig. 1).

The water-level is controlled in generator 100 by level-controller 300, comprising a diaphragm 230 having chambers above and below it in which the pressure is equalized when the water-level is below the inlet-end of a dip-tube 231 carried by the diaphragm. A release-branch 232 connected with a general release-pipe 233 leading to the receiver 93 of the engine 50 affords a constant small leakage from the upper diaphragm-chamber. When the inlet of the dip-tube is covered, pressure in the upper diaphragm-chamber is reduced by leakage through pipe 232 and the pressure underneath the diaphragm raises the latter and opens a by-pass-valve 234 controlling a by-pass conduit 235 which connects the delivery side of the pump 75 with its suction-side. Feeding of water to the generator 100 and level-controller 300 therefore ceases or diminishes until the level is reduced below the inlet end of the dip-tube. An extreme upward movement of the diaphragm will release a clutch 236 connecting the pump to its driving mechanism.

Equality of water-levels in the controller 300 and generator 100 would require in addition to the water-connection 237 between their lower portions, a gas-connection between the upper space of the controller above the water, and the outer space above the water in the generator. It will be noted that no such upper connection exists. I have instead made a U out of the generator and level controller and established the initial air-pressure from air-conduit 66, through the branch 238, on top of the water-leg in controller 300. On the water-leg in the generator cooling-chamber exists the sub-terminal pressure, which is less than the initial pressure by virtue of the resistance of the valve 102 and of the water-column in the cooling-chamber 152 which the gases have to displace. The level therefore stands higher in the cooling-chamber than in the controller. During the feeding of cooling-chamber by pump 75 the water-level rises parallel in the generator and controller at different heights until the leg in the controller reaches and covers the inlet of dip-tube 231. It can then rise no higher in the controller. It may, however, vary in the cooling-chamber 152 according to the differential between initial and terminal pressures. That is to say, if the resistance of the valve 102 for example be increased by increasing the pressure of spring 101, the drop from initial to sub-terminal pressure will increase and the water-level will rise in the cooling-chamber. As the height of water in said chamber controls the amount of outer surface of the combustion-tube 109 available for superheating the steam in the motive mixture, it will be apparent that the described combination affords a simple means for varying superheat by varying the resistance or differential in the generator. Means for doing this automatically and thus controlling surface superheat is provided by the thermostat 239 in the engine-pipe 68 (Fig. 1) connecting by a rod 240 attached to a pivoted lever 241 which bears on the upper end of spindle 99. Increase in temperature of the engine-bound fluid beyond a predetermined point exerts a downward pressure on the valve-spindle, thus increasing the pressure-drop through the generator and raising the water level in cooling-chamber 152, so as to decrease the superheating surface and avoid further rise of superheat, while a decreased temperature has the opposite effect, thus tending to a uniform temperature of the motive fluid.

1300 is a glass-legged U-tube containing a water-column which receives on one end the initial air-pressure from pipe 66 and on the other end the sub-terminal pressure from pipes 130 and 129, whereby the difference between these pressures, or in other words the total differential of the generator, may be visually indicated.

189 is a diaphragm receiving on its lower side the pressure of the air conduit 66 and on its upper side the constant pressure of atmosphere and a spring 190.

In the operation of the valve 102, it has been assumed that the differential pressure controlling the port-opening affected by said valve remains substantially constant except for the influence of the thermostat 239, thus affording the same difference between initial and terminal pressures at all pressures in the system. As these pressures normally tend to rise unless prevented from doing so, the densities of fluids controlled by the valve 102 will vary. Assuming at any instant a constant quantity of fluids burned in the generator, it is evident that for a higher pressure and fluid-density the velocity past the cone-valve 102 will diminish. In order to maintain this velocity constant, I may provide for increasing the differential as pressures increase, this being effected by means of a magnet or solenoid 249 pulling downwardly on the lever 241 and having in its circuit 250 a battery 251 and a rheostat 252 whose arm is controlled by the spindle 188 of the diaphragm 189. Therefore, as the pressure in the air-conduit 66 rises above a predetermined point the resistance will be decreased and the pull of the solenoid increased, thereby increasing the differential. This device also operates on the resistance-mechanism for generator 200, as later described.

Generator 200 is shown in Figs. 1 and 2 and its details in Figs. 3 to 8 inclusive. It includes a burner similar in general character to that of the generator 100, but differing somewhat in construction. This burner and its immediate appendages are made the subject of Patent No. 855,726. In said burner the air and gas are mixed in an antechamber before being passed into the combustion-chamber. Said antechamber is at 262 and the air and gas enter it from branch pipes 263, 264 after traversing a resistance-valve mechanism 800, later described. The mixed fluids from antechamber 262 enter the combustion-chamber through a water-cooled perforated valve-seat 265 under control of a valve 266, and additional air enters and mixes therewith under control of a second valve 267, being supplied through the hollow stem 268 of valve 266 from air-branch 269. The two valves open and close oppositely under control of two diaphragms 270, 271 receiving between them the sub-terminal pressure of the generator 100 through branch 272 from pipe 130 hereinbefore described. This same pressure is supplied also to the other diaphragms of generator 200. Initial air-pressure is supplied to the other sides of the diaphragms 270, 271 through air-branch 269 and the hollow interior of valve-stem 268. A spring 273 pressing oppositely between the diaphragms aids the sub-terminal pressure and imposes the differential pressure-drop. Two other valves 274, 275 are provided, controlling tangential flows into the combustion-chamber 286, the former operating principally to create a mixing whirl and the latter operating for this purpose and also to control an igniting and pilot-flame flow. The two valves are attached to diaphragms 276, 277 receiving on their inner sides air-pressure from the pipe 278 and branches 279, 280, and on their outer sides sub-terminal pressure from the branches 281, 282 of pipe 130, aided by the pressure of springs 283, 284. The diaphragm 277 is of somewhat greater area than diaphragm 276 and is equal to the area of either diaphragm 270 or 271. The pressure of springs 283 and 284 are equal and preferably somewhat less than that of spring 268, the result being that the differential for pilot-valve 275 is somewhat less than that for the main valves 266, 267, while the differential for valve 274 is somewhat greater. A pilot-flame will therefore always be maintained, and in starting, the main flow past valves 266, 267 and the tangential flow past valve 274 will become established in the order named.

285 is a short ignition-thimble projecting slightly into the combustion-chamber 286 and heated externally by a small burner 287, fed by low-pressure gas from a branch 288 of pipe 64 and conduit-air under high pressure by a branch 289. Super-initial-pressure gas is supplied to the pilot-burner through pipe 290 from a high-pressure reservoir 85 and may be arranged to carry the initial air with it. The mixture issuing into the combustion-chamber past valve 275 impinges on the hot end of igniter-thimble 285 and ignites the main flow of combustible. After ignition is effected the flame supplied by burner 287 may be discontinued and the flow past valve 275 continued for a pilot flame.

291 is the combustion-tube of the generator 200. Surrounding the intermediate portion of said combustion-tube is a steam-boiler 292, and surrounding the lower part of said tube is a water-pot 293 into which the products of combustion emerge and wherein they continuously vaporize the contained water and pass onwardly together with the body of steam thus created through a pipe 294 into the cooling-chamber of the generator 100. The water-pot or cooling-chamber 293 therefore constitutes an extension of the cooling-chamber 152. A return circulation is afforded between these two water-chambers by means of a pipe 295 having stop-valves 296, 297 on either side of the entrance to level-controller 400. The latter is connected by a branch 298 with the water-supply-pipe 74, said branch containing a stop-valve 299. There is also a stop-valve 301 between branch 298 and the pump 75, and between this stop-valve and the pump is an automatic valve-mechanism 302. The latter comprises a valve 303 (Fig. 2) controlled by a diaphragm 304 receiving on its lower side the pressure of pipe 74 and on its upper side the pressure of the cooling-chamber 152 through branch 305. The purpose of this diaphragm is to cut off the pump 75 until pressure in the generator 100 shall have risen to that of the steam-boiler 292, as later described.

The level-controller 400 is similar in operation to the controller 300 and embodies a diaphragm 306 operating a balanced boiler-feed-valve 307. The level is maintained equal in boiler 292 and controller 400 by pipes 308, 309, and when it rises above the inlet of a dip-tube 310 carried by the diaphragm, leakage from the upper diaphragm-chamber through a pipe 311 to the condenser 71 lowers the pressure in this chamber and the diaphragm rises, closing valve 307. In normal running, the boiler 292 receives water from the water-pots 152 and 293 through pipe 295 under control of the valve 307, which admits enough water to the boiler to maintain a predetermined level in the latter and throttles this water in its entrance to the boiler. Since the water thus entering the steam-boiler has been raised to the temperature of boiling water at the internal-combustion burner pressure by means of the products of combustion from combustion-tubes 109 and 291, and since it is proposed to carry a somewhat lower pressure (automatically determined by the diaphragm 340 and spring 342 hereinafter described) in the boiler 292, a portion of this boiling feed-water immediately flashes into steam on entering the boiler, and the remainder is at the vaporizing temperature and may be completely vaporized by an addition of heat from the walls of the combustion-tube 291. The steam generated in boiler 292 passes through pipe 69 to the engine 51, does work in the latter and is exhausted to the condenser 71, in which a vacuum is maintained by the usual methods. I thus provide a possible range of pressure from the highest pressure of the system to the lowest pressure obtainable by a vacuum, a range which I believe to be greater than any heretofore capable of realization in internal-combustion systems of this class. There is, of course, a theoretical thermodynamic loss in the free fall of pressure past valve 307, but this is compensated for by theoretical and practical gains, among which are the fact that more of the heat employed in vaporizing the water is utilized in the engine than with ordinary steam boilers. The boiler 292 is also employed as a means for obtaining pressure to start the apparatus through the agency of the engine 51, and is furnished with heating flues 312, a burner 313 supplied with atmospheric air, and with low-pressure gas through a branch 314 of the pipe 64, and an outlet or "stack" 315 for products of combustion, which may be closed by a stop-valve 316. Further functions of the boiler 292 are, first to act temporarily as a feed-heater for water supplied to the water-pots 152 and 293 in starting as later described, for which purpose it has a pipe 317 joining the general feed-pipe 74 and provided with a stop-valve 318; and secondly to pre-heat the air supplied to the burners of the two generators when the atmospheric burner 313 is discontinued, for which purpose a branch 319, provided with stop-valve 320, leads from the air-conduit 66 to the space below the flues 312, while a second pipe 321 carries the air thus pre-heated from the upper flue-space to the air-supply branch 121 for generator 100, and to a second air-supply branch 322, whence after traversing the resistance-mechanism 800 the air passes by the branch 263 to the burner of generator 200. By means of a valved by-pass 1321, steam may be admitted from boiler 292 into the air lines of the two burners to temper the heat therein and cause the combustion temperatures to approximate the decomposing temperature of steam. The additional functions of the steam-boiler just mentioned will be further referred to in describing the operation of starting.

The pressure in the combustion-tube 109 of generator 100 has been referred to as terminal pressure, being the pressure posterior to the resistance-valve in the head of said generator. The pressure above the water outside of this tube has been referred to as sub-terminal pressure, and it will be noted that it differs from the terminal pressure by an amount measured by the difference in level on the outer and inner sides of the combustion-tube, the differential at the outlet of said tube being that pressure which is required to depress the water within the combustion tube until an area of perforations is uncovered adequate to pass the volume of gases. Sub-terminal pressures for the two generators are equal because the gases and steam from the water-pot 293 reach the cooling-chamber 152 of the generator 100. The immediate-terminal pressures in the two combustion-chambers are not necessarily equal. The terminal pressure in generator 200 is subject to control by means of a device shown at the lower end of its combustion-tube for varying the water-pot differential. The tube 291 has two series of perforations 323 for passing products of combustion into the water-pot 293, and these are controlled by a two-legged rotary slide 324 having an externally-accessible stem 325, the rotation of which causes a different number of vertical rows of the perforations to be uncovered. The water differential may be varied in two ways, first by having a lower level of water in the water-pot 293 and allowing a partial uncovering of perforations, and, secondly, by rotating the slide 324. Such control will have an effect on the distribution of combustion fluids to the two generators as will be understood from subsequent description.

The mechanism 800 consists of a "line I-T" valve-device (that is, an initial-terminal pressure-controlled valve placed in the combustion-fluid lines anterior to the burner) for controlling the resistance to the passage of air and gas to the generator 200, in accordance with the respective requirements of the two generators. The desirability of a line I-T valve or an equivalent meter in the branch supply lines to either or both of the generators 100 and 200 will be evident when it is considered that these generators are supplied in parallel from common air and gas compressors, so that even though the compressors are delivering fluids in the correct ratio for perfect combustion, if the supply of either fluid is divided and goes to two burners, the ratio at each burner will not necessarily remain constant unless the resistances are proportional in the branches going to one burner. The device 800 maintains the resistances in the air and gas branches for generator 200 proportional during variations in pressure and hence performs the desired metering function. Its details are shown in Figs. 9 to 12 inclusive. Its casing has orifices 326, 327, 328 and piston-valves 329, 330, 331 for controlling respectively the gas flowing by branches 332 and 264 from the gas-conduit 67 to the burner antechamber 262, and air flowing from an air-branch 333 by way of the interiors of the hollow valves 330, 331 and the branches 263 and 278 hereinbefore described, to the antechamber 262 and the tangent valves 274, 275 respectively. The piston 334 is simply a sliding partition to separate the air from the gas. Rings 335 actuated by tangent screws serve to obtain the desired proportion of the total port-areas available for control by vertical movements of the valves. The several valves are mounted upon a stem 336 attached to a diaphragm 337, the latter receiving on its upper side the initial air-pressure from air-branch 333 and on its lower side the pressure terminal to the air-valves 330, 331 through a branch 338, and that of an upwardly-pressing spring 339, aiding the terminal pressure. As this so-called terminal pressure is not identical with that in the combustion-chamber but suffers a further drop before reaching said chamber, I will hereinafter refer to it as "sub-initial" pressure.

It will be observed that the initial pressure for the two generators 100 and 200 is the same, being that of the air and gas conduits 66 and 67, and their sub-terminal pressures are equal, being that above the outer water-leg in cooling-chamber 152. Therefore the total pressure-drop of the gaseous fluids in both generators is the same. This pressure-drop in the generator 100 occurs in two stages, first that of the "I-T" valve device in the generator-head, and, second, that of the cooling-chamber 152. For the generator 200, however, the drop from initial to sub-terminal pressure is in three stages: first, that of the mechanism 800; second, that of the I-T valves in the generator-head; and third, that of the water-pot 293. The pressure between mechanism 800 and the valves of the generator-head is referred to as sub-initial pressure. Since the diaphragm 337 is controlled by the initial and terminal (sub-initial) pressures of only one of the flows which it controls, that is, the main burner air-flow of branches 333 and 263, it will not meter the other flows in proportion unless their initial and sub-initial pressures are the same as those of the main flow or in a predetermined relation thereto. The initial pressures are the same, as already seen, being that of the air and gas conduits. The sub-initial pressures for gas and primary air via pipes 264, 263 is equal, because these flows unite in the antechamber 262. Hence the required conditions are maintained. The sub-initial for tangential flows past the valves 274, 275 is not necessarily the same as the aforesaid sub-initial, but depends upon the differential imposed by the tangent-valves, which, however, is subject to control by regulating the springs 283, 284.

The resistance imposed by mechanism 800 is varied by varying the tension of spring 339 in accordance with the combustion requirements of the generator 200. This is done by a diaphragm 340, connecting by a stem 341 with the follower of spring 339, and receiving on its under side the pressure of the boiler 200 from pipe 317 and on its upper side the pressure of the atmosphere and of a spring 342. Arrangement is made for varying the effective length of stem 341 by a screw-threaded telescope connection 343 in said stem, and the tension of spring 339 may be varied by rotating a screw threaded nut 344, the two threads being so pitched that one adjustment does not disturb the other. An increase of boiler-pressure beyond the predetermined point demands less fire in the combustion-tube 291, and the increase in tension of the spring 339 effected by diaphragm 340 therefore increases the resistance of the piston-valves attached to stem 336 and diverts air and gas to the generator 100. The total resistance or gas-flow obstruction for each generator remaining constant, flows will be divided between the generators according to their respective capacities, but any variation in either resistance, such as afforded by the mechanism just described, diverts combustion fluids from one generator to the other. An influence tending to maintain these resistances equal is afforded by the equalizing-lever 241 connecting the spindle 99 of the I-T valve for the generator 100 with the spindle 336 of the line I-T mechanism 800 for the generator 200. Any cause which increases or decreases the differential for generator 100 will correspondingly increase or decrease that for generator 200. The thermostat 239 acting through rod 240 for varying the differential in generator 100 to vary surface superheat, therefore acts equally on mechanism 800 to maintain the differentials alike. The solenoid 249 for increasing the differential, initial air-pressure rises, also acts equally on the resistances for both generators. Lever 241 may permissibly be elastic, in order to cushion sudden or violent movements of either resistance-spindle. Any sudden diversion of flow, to the generator 100 for example, tending to upset equilibrium, is compensated for by a magnet or solenoid 345, of which the coil is on the stem of valve 266 of the generator 200 and the core on the stem of valve 267, said solenoid having in its circuit 346 a battery 347 and a rheostat 348, whose arm is actuated by rod 349 from the spindle 99 of the generator 100. A greater volume of flow through said generator, raising the said spindle, decreases the resistance in the circuit of solenoid 345, causing said solenoid to draw the valves 266, 267 together, increasing the differential at the burner of the generator 200 and maintaining velocity of flow so as to prevent extinguishment of its flame and back-firing.

Starting is effected by steam pressure raised in the boiler 292 by means of the atmospheric burner 313, and propelling the engine 51, thereby operating the air and gas compresors 52 and 53. From the boiler the products of combustion from atmospheric burner 313 are allowed to escape through the flue 315. Water is supplied to the boiler 292 through pipe 74 and branch 298 and its level is regulated by the controller 400. Stop-valve 301 is at first closed and stop-valve 318 is opened so that water can at first reach the cooling-chamber of generator 100 only through pipe 317 from the boiler. Stop-valves 296 and 297 are also closed and the return circulation between the water-pots 152, 293 when it occurs is by way of loop 350. Valve 303 and diaphragm 304 at first prevent water from reaching the suction of pump 75 until the pressure in generator 100 rises superior to the pressure in pipe 74, which is that of the street-main or other source of water supply. It will be seen that valve 303 is equipped with an externally-accessible stem 350$^a$ which allows said valve to be opened by hand to admit water into the cooling-chamber 152 and thence into water-pot 293 and level-controller 300, mainly for the purpose of effecting a water-seal in the lower part of generator 100 and level-controller 300. This prevents hot gases from reaching the diaphragm 230 when the burner is first started, and prevents initial air from reaching the combustion-chamber by way of pipe 238 and the level-controller. After the boiler 292 has raised steam and operated the engine 51, the burners of generators 100 and 200 may be started. The products of combustion may at first find the cooling-chambers scantily supplied with water and be allowed to pass on unquenched into the engine-conduit and engine, their full heat being employed in warming up the metal parts. Whenever the throttle-valve in engine-pipe 68 is opened, the combustion-products, of course, assist in driving the engine. As soon as water-level has risen to cover the ends of the combustion-tubes the water assumes control of temperature conditions and the apparatus soon attains full working pressure, which I prefer to establish at the high level of from 250 to 350 pounds per square inch. The pressure in the generators rises very quickly after ignition and as soon as that in generator 100 overtops the pressure in water-pipe 74 the valve 303 opens and admits hot water from boiler 292 to the suction side of the pump 75. The latter pumps this hot water into the cooling-chamber 152 of generator 100 and the steam-boiler becomes a feed-water heater for the cooling-chambers of the generators, while at the same time furnishing steam to the engine 51. Additional cold water may be supplied to the generators if necessary by opening stop-valve 301. It will be noted that this procedure whereby the steam-boiler acts as feed-water heater is the converse of that subsequently occurring, in which cooling chamber water at the boiling point is supplied to the boiler and throttled down by the valve 307. When this normal procedure is to be instituted, valves 318 and 299 are closed and valves 296, 297 opened. If the first-occurring double function of the boiler were instead to be adopted as normal procedure, some enlargement in its dimensions might be necessary above the requirement for feed-heating and starting. After the internal-combustion department has been put in operation the atmospheric burner 313 under boiler 292 is discontinued and air for the generators, which, up to that time, had traversed a branch-pipe 352 in reaching the air-branches 121 and 333, is now passed through pipes 319 and 321 and through the flues 312 of the steam-boiler, thereby becoming pre-heated by taking up a portion of the heat of the boiler contents. For this purpose, valve 320 is opened and a valve 353 in branch 352 is closed. The gate 316 in flue 315 and the atmospheric intake valve (not shown) of pipe 319 are likewise closed.

It will be understood that various modifications of embodiment, and permitted omissions of parts of the described apparatus are contemplated as not departing from the scope of the claims.

I claim:—

1. In constant-pressure power apparatus, the combination of an internal-combustion generator, a water-supply conduit therefor, a pump to force water into the generator, and a valve controlling the suction of the pump and differentially controlled by the pressure in the generator and in the supply-pipe anterior to the pump.

2. In constant-pressure power apparatus, the combination of a compressed-air line, a fuel-burner in said line, a steam boiler heated by the pressure combustion, and means to employ the steam from said boiler separately from the products of combustion.

3. In constant-pressure power apparatus, the combination of a compressed-air line, a fuel-burner is said line, a steam boiler heated by the pressure combustion, and separate engines using the products of combustion and steam respectively.

4. In constant-pressure power apparatus, the combination of a compressed-air line, a fuel-burner in said line, a steam boiler heated by the pressure combustion, and separate engines using the products of combustion and steam respectively and operating the same shaft.

5. In constant-pressure power apparatus, the combination of a compressed-air line, an internal-combustion fuel-burner in said line, a combustion-tube for the burner, and means for water-jacketing the intermediate portion of said tube.

6. In constant-pressure power apparatus, the combination of a combustion-tube, having an outlet, a water-pot for immersing said outlet, a steam boiler jacketing said tube back of the outlet, and separate engines employing respectively the mixture of steam and products of combustion from said water-pot, and the boiler steam.

7. In constant-pressure power apparatus, the combination of an internal-combustion generator having a water-pot in the path of the products of combustion, means for feeding an excess of water to said water-pot, and a steam boiler supplied by the excess.

8. In constant-pressure power apparatus, the combination of an internal-combustion generator having a combustion tube, a water-pot embracing the outlet of said tube, means for feeding an excess of water to said pot, and a steam boiler heated through the walls of said tube and supplied with hot feed-water from said water-pot.

9. In constant-pressure power apparatus, the combination of an internal-combustion generator, means to supply water thereto, a steam boiler supplied with hot water from the generator, and a throttle-valve in the boiler-supply line controlled by the level of water in the boiler.

10. In constant-pressure power apparatus, the combination of two internal-combustion burners, an engine driven by the products of combustion therefrom, and a steam boiler heated by one of the burners and supplying a separate body of steam.

11. In constant-pressure power apparatus, the combination of two internal-combustion burners having combustion-tubes, water-pots embracing the outlets of said tubes, and a water-conduit connecting the water-pots whereby one constitutes an extension of the other.

12. In constant-pressure power apparatus, the combination of two internal-combustion generators having water-pots in the paths of their products of combustion, one of which is wholly below the water-line level of the other, and water-circulating pipes connecting said pots.

13. In constant-pressure power apparatus, the combination of an internal-combustion generator, an engine driven by the products of combustion therefrom, a second generator having a boiler provided with an internal-combustion burner and also with an external heater, and an engine operated by the steam from said boiler and connected to drive the first-said engine.

14. In constant-pressure power apparatus, the combination of an engine operated by internal combustion, a compressor driven by the engine for supplying its combustion fluid, an internal-combustion generator including a pure-steam boiler, and an engine supplied by said boiler and connected to drive the first-said engine.

15. In constant-pressure power apparatus, the combination of two internal-combustion burners, a water-pot in the path of the products of combustion from one of the burners, an auxiliary boiler heated by one of the burners and having an external heater, and a connection whereby said boiler may supply heated feed-water to the water-pot.

16. In constant-pressure power apparatus, the combination of a combustion tube having a burner at its upper end adapted to discharge its products of combustion downwardly through said tube, means for quenching said products of combustion in water, means for supplying air and fuel under pressure to said burner, an auxiliary boiler heated through the walls of said tube and provided with air-heating flues, and means for supplying unburned compressed air to said flues.

17. In constant-pressure power apparatus, the combination of a generator having an internal-combustion burner, a boiler heated thereby and having flues, an auxiliary heater for said boiler having a combustion-chamber connecting with said flues, means to convert said combustion-chamber into a compressed-air chamber, and means for supplying compressed air through said chamber and flues to the internal-combustion burner.

18. In constant-pressure power apparatus, the combination of an internal-combustion burner, means for supplying combustion fluid thereto under pressure, a pure-steam boiler heated by said burner, and means controlled by the boiler pressure for regulating the supply of combustion fluid to said burner.

19. In constant-pressure power apparatus, the combination of an internal-combustion burner, means for supplying combustion fluid thereto under pressure, an auxiliary boiler heated by said burner, a resistance-valve controlling the burner fluid-supply and controlled differentially by the pressures anterior and posterior to the valve, and means controlled by the boiler pressure for varying the differential imposed by said valve.

20. In constant-pressure power apparatus, the combination of a compressed-air line, a resistance-valve in said line controlled differentially by the pressures anterior and posterior to the valve and having a differential-imposing spring, an internal-combustion burner in said line, an auxiliary boiler heated by said burner, and means controlled by the boiler pressure for varying the tension of said spring.

21. In constant-pressure power apparatus, the combination of an engine, two constant-pressure internal-combustion burners supplying said engine in parallel, means for supplying combustion fluids in parallel to the respective burners, and means controlled by the fluid-pressure supply of one of said burners for controlling that of the other burner.

22. In constant-pressure power apparatus, the combination of two internal-combustion burners, means for supplying combustion fluids in parallel thereto under pressure, automatic valves controlling the supplies for the respective burners, and connections between said valves for coördinating their action.

23. In constant-pressure power apparatus, the combination of two internal-combustion burners, means for supplying combustion fluids in parallel thereto from a common source, valves controlling the supplies to the respective burners and automatically responsive to the volume of flow through the latter, and a travel-equalizing connection between said valves.

24. In constant-pressure power apparatus, the combination of two internal-combustion generators having a common source of pressure-fluid supply, valves controlling the supplies to the respective generators and controlled differentially by the pressures anterior and posterior to the valves, and a connection between said valves for coördinating their action.

25. In constant-pressure power apparatus, the combination of two parallel-operating internal-combustion generators having automatic resistance-valves, and means controlled by the temperature of the output of said generators for coördinately varying the resistance afforded by said valves.

26. In constant-pressure power apparatus, the combination of two internal-combustion generators having a common source of pressure-fluid supply, valves controlling the supplies to the respective generators and controlled differentially by the pressures anterior and posterior to the valves, a connection between said valves for coördinating their action, a thermostat operating on said connection, and an outlet from said generators whose temperature controls the thermostat.

27. In constant-pressure power apparatus, the combination of two parallel-operating internal-combustion generators, means for supplying said generators with combustion-fluid at a common anterior pressure, water-pool coolers in the paths of the products of combustion, and means for connecting the spaces beyond said coolers to afford a common posterior pressure.

28. In constant-pressure internal-combustion power apparatus, the combination of two parallel-working internal-combustion generators, compressed air and gas supply conduits branching to the respective generators, and means responsive to the volume of flow to one of said generators for automatically maintaining proportionate resistance in the branch conduits leading thereto.

29. In constant-pressure power apparatus, the combination of two internal-combustion generators, air and gas-compressors common to said generators for supplying combustion fluids thereto in parallel, valves controlling the supply of said fluids to one of the generators and connected to vary their orifices proportionately, and means controlled differentially by the pressures anterior and posterior to one of said valves for operating the valves in response to the varying volumes of flow.

30. In constant-pressure power apparatus, the combination of two parallel-operating internal-combustion generators, means to supply air and gas thereto under pressure, two valve-devices controlling the air and gas inlets to the respective generators and controlled differentially by the pressures anterior and posterior to said devices, and a third valve-device controlling the air and gas flows to one of the other said devices and automatically responsive to the volume of flow of one of said fluids.

31. In internal-combustion power apparatus, the combination of two parallel-operating internal-combustion generators, means for supplying air and gas thereto under pressure, two valve-devices controlling the inlets to the respective generators and connected for coördinate action, said devices being responsive to the volume of fluid flow into the generators, and a third valve-device controlling the resistance to the flow of said fluids to one of the first-said valve devices and responsive to the volume of said flow.

32. In constant-pressure power apparatus, the combination of two parallel-operating internal-combustion generators, an engine supplied thereby, compressors operated by said engine for supplying combustion-fluids to said generators, an auxiliary boiler included in one of said generators for supplying pure steam to operate said engine, and means controlled by the pressure of said boiler for automatically apportioning the supply of combustion-fluid between the respective generators.

33. In constant-pressure power apparatus, the combination of two parallel-operating internal-combustion generators, valve-devices controlling the supply of combustion fluids to the respective generators and controlled differentially by the pressures anterior and posterior to said devices, a separate steam boiler included in one of said generators, a third valve-device controlling the supply of said fluids to one of the first-said devices and controlled differentially by the pressures anterior and posterior to itself, and means controlled by the boiler pressure for controlling the last-said valve-device.

34. In constant-pressure power apparatus, the combination of an internal-combustion generator including a combustion-tube having a foraminous outlet, means for immersing said outlet with water, and means associated with said outlet for varying the area of exposed apertures thereof to adjust the relation between the pressures anterior and posterior to the water-pool.

35. In constant-pressure power apparatus, the combination of two parallel-working internal-combustion generators having combustion-tubes, water-pots embracing the outlets of said tubes, means for varying the resistance of one of said outlets independently of the other, and a common gas-and-steam outlet from said water-pots.

In testimony whereof I have hereunto set my hand in the presence of two subscribing witnesses, this 17th day of March 1911.

EDWARD P. NOYES.

Witnesses:
FORREST R. ROULSTONE,
P. W. PEZZETTI.

---

Copies of this patent may be obtained for five cents each, by addressing the "Commissioner of Patents, Washington, D. C."